United States Patent [19]

Flanagan et al.

[11] 3,891,805

[45] June 24, 1975

[54] DIGITAL SIGNAL DETECTION IN TELEPHONIC COMMUNICATION SYSTEMS

[76] Inventors: James Loton Flanagan, 20 Sage Dr., Warren, N.J. 07060; Nuggehally Sampath Jayant, 30 Elm St., Morristown, N.J. 07960

[22] Filed: Nov. 21, 1973

[21] Appl. No.: 417,880

[52] U.S. Cl. .......................... 179/15 BF; 179/15 AT

[51] Int. Cl. ................................................ H04j 3/14

[58] Field of Search ....... 179/15 AT, 15 BS, 15 BC, 179/15 BF, 18 FC, 2 TV, 15 AS; 340/146.2; 328/165

[56] References Cited

UNITED STATES PATENTS

| | | | |
|---|---|---|---|
| 3,573,377 | 4/1971 | Anderson | 179/2 TV |
| 3,673,335 | 6/1972 | Joel | 179/15 AT |
| 3,715,508 | 2/1973 | Blasbalg | 179/15 BC |
| 3,778,555 | 12/1973 | Noroling | 179/18 FC |
| 3,792,201 | 2/1974 | Osborne | 179/15 BS |

*Primary Examiner*—David L. Stewart

[57] ABSTRACT

In a communication system incorporating digital and analog signal terminals capable of being interconnected via a common switching network, digital terminals communicating with each other are detected by digitally correlating the incoming and outgoing signals of each digital terminal with the outgoing and incoming digital signals, respectively, of all other digital terminals in the system.

16 Claims, 6 Drawing Figures

DIGITAL SIGNAL DETECTION IN TELEPHONIC COMMUNICATION SYSTEMS

BACKGROUND OF THE INVENTION

This invention relates to the field of call detection and verification in telephonic communication systems serving digital and analog subscriber terminals.

In a communication system serving both digital and analog terminals, calls originating from digital subscriber terminals may be required to be connected to either digital or analog subscriber terminals. In the prior art, such communication systems provide dedicated decoder and encoder hardware for each digital subscriber terminal for converting the digital signal to analog format, and, thus, all switching interconnections are made with analog signals. However, the dedicated decoding and encoding hardware increases the cost of the system. Also, the conversion of signal formats from digital to analog, and back to digital, increases quantization noise and thereby degrades the transmission quality between digital terminals.

It is a general object of this invention, therefore, to reduce hardware complexity and to improve signal transmission quality by eliminating redundant encoder-decoder pairs in communication systems of the type described.

It is another object of this invention to efficiently detect interconnections between pairs of digital signal terminals in order to enable the deletion of encoder-decoder pairs from the signal path of such interconnections.

It is still another object of this invention to provide an efficient method and apparatus for determining which of a plurality of digital terminals is connected to a particular digital terminal under observation.

SUMMARY OF THE INVENTION

The foregoing and other objects of the invention are achieved by using nondedicated encoder-decoder pairs. These pairs are selectively interconnected within the telephonic communication system in response to developed control signals which are indicative of which digital terminals in the system are connected to other digital terminals in the system, and which digital terminals are connected to analog terminals.

In accordance with this invention, when a digital subscriber terminal is activated by a user, an idle encoder-decoder pair is connected to the activated digital terminal. Following the connection, and in response to a system test, if it is ascertained that the activated digital terminal is communicating with another digital terminal in the system, the previously attached decoder-encoder pair is switched out of the communication path. If, on the other hand, it is determined that the activated digital terminal is connected to an analog subscriber terminal, the encoder-decoder pair is left in the communication path.

The detection of communication between digital terminals is achieved in accordance with this invention by appropriately correlating the digital signals of active terminals in the system. More specifically, the digital signal from a selected active terminal is sequentially correlated with the digital signal of all other active digital terminals thereby developing a plurality of correlation signals. If any one of the developed correlation signals attains a predetermined large magnitude, it is concluded that the particular digital terminal contributing to a large correlation signal is communicating with the selected digital terminal. When such communication is ascertained, the encoder-decoder pairs previously connected to the two digital terminals (the selected terminal and the tested terminal) are switched out of the communication path. If none of the developed correlation signals attain a large magnitude, it is concluded that the selected terminal is communicating with an analog terminal; in which case, the encoder-decoder pair previously connected to the selected terminal is not disconnected from the communication path. To test the entire communication system, all active digital terminals are sequentially selected, the signals thereof correlated with all other active digital terminal signals, and tested in the above manner.

DETAILED DESCRIPTION

Figure 1:
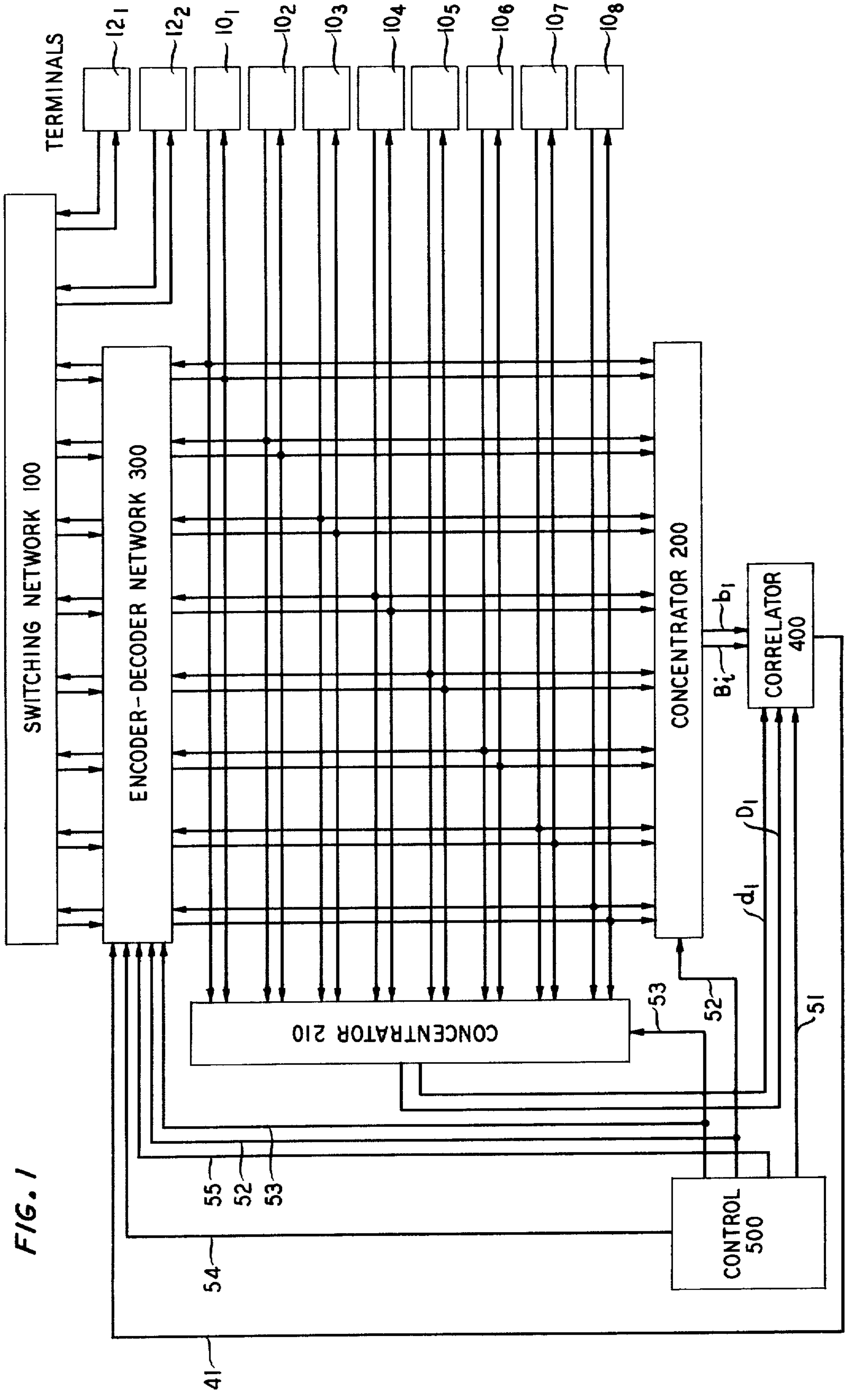
FIG. 1 is a block diagram of a communication system which includes apparatus, in accordance with this invention, for interposing encoder-decoder pairs on a nondedicated basis within the communication path of selected digital signal terminals.

FIG. 1 depicts a general block diagram of a telephonic communication switching system incorporating digital and analog terminal equipment. This system includes apparatus for detecting which ones of a plurality of digital signal terminals are communicating with each other and apparatus for selectively switching encoder-decoder pairs into, and out of, certain communications paths, as hereinafter described.

The communication system of FIG. 1 comprises analog terminals $12_1$ and $12_2$, e.g., standard Bell System telephones, digital terminals $10_1$, $10_2$ . . . $10_K$, e.g., Western Electric Data Sets, Model 201, and a switching network 100 through which any of the terminals can be interconnected. Switching network 100 may be any switching network capable of interconnecting any two terminals and transferring analog or digital signals between them. One such switching network is the Western Electric No. 5 Crossbar System, found in many of the Bell System central offices. The communication system of FIG. 1 further comprises an encoder-decoder network 300 interposed between digital terminals $10_1$, $10_2$ . . . $10_K$ and switching network 100.

In accordance with the invention, when a digital terminal is activated, network 300 initially places an encoder-decoder pair within the signal path of the activated terminal but, subsequently, in response to control signals on lines 41, 54, and 55 and on bus lines 52 and 53, network 300 switches the encoder-decoder pair out of the communication path of the active terminal if it is determined that the encoder-decoder pair is not required. The encoders within network 300 may be standard A/D converters which encode an analog signal into a digital signal having a preselected format. The decoders within network 300 must be D/A converters which correspond to the A/D converters used.

Further connected to terminals $10_1$, $10_2$ . . . $10_k$ are concentrators 200 and 210 which, in response to selection control signals from control circuit 500 on bus lines 52 and 53, respectively, apply the signals of digital terminals selected for testing (signals $B_i$, $b_i$ and $D_i$, $d_i$, respectively) to correlator 400. Correlator 400 develops a correlation signal associated with the selected terminals' signals and compares the magnitude of the correlation signal to a predetermined threshold level. If the correlation signal associated with a particular pair of terminals selected for testing exceeds the threshold level, the output signal of correlator 400 (on line 41), in cooperation with control signals on lines 54 and 55 and on bus lines 52 and 53, switches the encoder-decoder pairs in network 300 out of the communication path of the tested terminals. If the threshold level is not exceeded, the encoder-decoder pairs are not switched out.

The effectiveness of using correlator 400 to determine which digital signal terminals in the telephonic communication system of FIG. 1 are connected to each other can be expressed mathematically. Assume, for example, that the digital signal terminals of FIG. 1 operate in a one-bit adaptive delta modulation (ADM) format, and that $b_i$ and $B_i$ are the outgoing and incoming bit streams of one terminal, respectively, and the $d_i$ and $D_i$ are the outgoing and incoming bit streams of another terminal, respectively, where $i$ is the bit number from some time reference. In accordance with this invention, the correlation of concern is $$C(T,L) = \text{Max}\left\{\left[\frac{1}{W}\sum_{i=T}^{T+W} B_i d_{i-L}\right], \left[\frac{1}{W}\sum_{i=T}^{T+W} D_i b_{i-L}\right]\right\} \quad (1)$$

where $T$ is the time at which the correlation is evaluated, $L$ is the delay (in the number of samples) between the two signals due to encoder-decoder conversion delays, $W$ is a computational window (also in number of samples) in which averaging of the product is done, and where Max { } indicates the selection of the larger of the two bracketed terms. The selection of the larger value in equation (1) insures that $C(T,L)$ would represent the correlation of the active (speech carrying) path of the two way communication channel. Also, in the computation of $C(T,L)$ of equation (1), division by the constant $W$ to obtain the average is superfluous for a prescribed window size.

It has been discovered that the value that the correlation function C achieves provides a reliable decision as to whether the two signals represent the same information, even though quantization noise is introduced by the decoding and re-encoding steps. For example, in a one-bit memory adaptive delta modulation system, it has been found that typical practical values for correlation computation can be in the range of W = 5 to 10 samples and L = 1 to 5 samples for a 60 kHz ADM signal, and that values of C obtained from speech processed by a one-bit memory ADM system when two terminals are connected to each other range between 0.3 and 0.6 (C would equal 1.0 in the absence of quantization noise). When two terminals are not connected to each other, C ranges from −0.05 to +0.05. In accordance with the above, a determination of C and a comparison of the value of C to a threshold level of, e.g., 0.2, provides a good indication as to whether two terminals are communicating with each other.

The reliability of the indication can be further enhanced by the use of a time-diversity strategy in which C(T,L) is computed as the average of correlations measured at different points in time to provide independence of measurement, e.g., spacing of 100 samples is greater. Still further improvement in reliability of proper detection can be had by maximizing equation (1) as a function of L.

Other variations on the correlation of concern are also possible. For example, rather than picking a maximum as indicated by equation (1), the correlation can be defined as follows:

$$C(T,L) = \frac{1}{W}\sum_{i=T}^{T+W} (B_i d_{i-L} + D_i b_{i-L}) \quad (2).$$

Also, a still simpler expression can be defined by considering only one way communication, yielding the expression $$C(T,L) = \frac{1}{W}\sum_{i=T}^{T+W} B_i d_{i-L} \quad (3).$$

The above correlation approaches are not restricted to adaptive delta modulation nor to nonadaptive delta modulation but, rather, these approaches are applicable to all digital signal representations, such as PCM.

Figure 2:
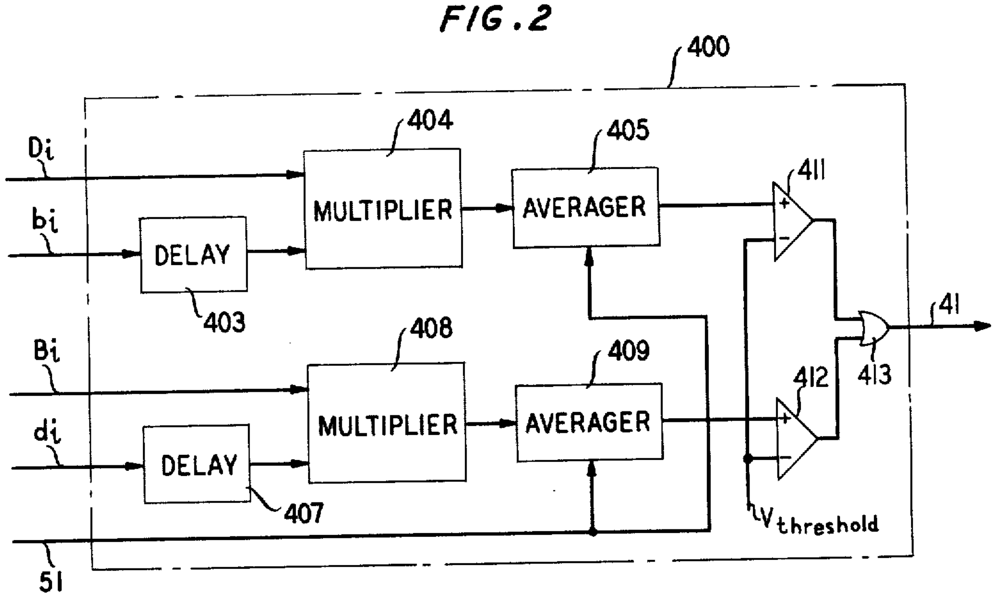
FIG. 2 is a block diagram of a correlator used in the system of FIG. 1.

Correlator 400, shown in FIG. 2, implements equation (1) and, in addition, performs the threshold tests. It comprises a delay element 403 responsive to the outgoing signal ($b_i$) of the digital terminal selected by concentrator 200, a multiplier 404 whose one input is connected to delay element 403 and whose other input is responsive to the incoming signal ($D_i$) of the digital terminal selected by concentrator 210, and a switched averager 405 responsive to the output signal of multiplier 404 and to a control signal on line 51 emanating from control circuit 500. Correlator 400 further comprises a delay element 407, a multiplier 408, and a switched averager 409 interconnected in a manner identical to that of elements 403, 404, and 405 above, with the delay element 407 connected to the outgoing signal ($d_i$) of the digital terminal selected by concentrator 210, and with multiplier 408 connected to the incoming signal ($B_i$) of the digital terminal selected by concentrator 200. Lastly, within correlator 400 the output signals of averagers 405 and 409 are each compared to a predetermined analog threshold voltage by identical threshold detectors 411 and 412, e.g., Texas Instruments, Inc., SN72810. The digital output signals of detectors 411 and 412 are connected to OR gate 413 which develops a control signal, in accordance with equation (1), on line 41.

Delay elements 403 and 407 are digital delay elements, e.g., shift registers, which compensate for the signal delay in the communication system of FIG. 1. This delay is mainly caused by the encoder-decoder conversions within network 300.

Multipliers 404 and 408 generate signals representative of the product of the applied digital signals in the particular digital coding format used within the communication system. Accordingly, the structure of the multipliers is dictated by the particular coding format in the system. For example, in a one-bit memory adaptive (or nonadaptive) delta modulation system, multipliers 404 and 408 may simply consist of coincidence circuits.

Switched averagers 405 and 409 integrate the output signal of multipliers 404 and 408, respectively, and store the integrated output in a sample-and-hold circuit. The output signals of the averagers are reset to a predetermined level (e.g., zero volts) by the control signal on line 51 when a new pair of terminals is selected for testing. One suitable embodiment for averager 405 may comprise, for example, the averager described by Sugiyama et al, U.S. Pat. No. 3,636,458, issued Jan. 18, 1972 preceded by an A/D converter.

Figure 3:
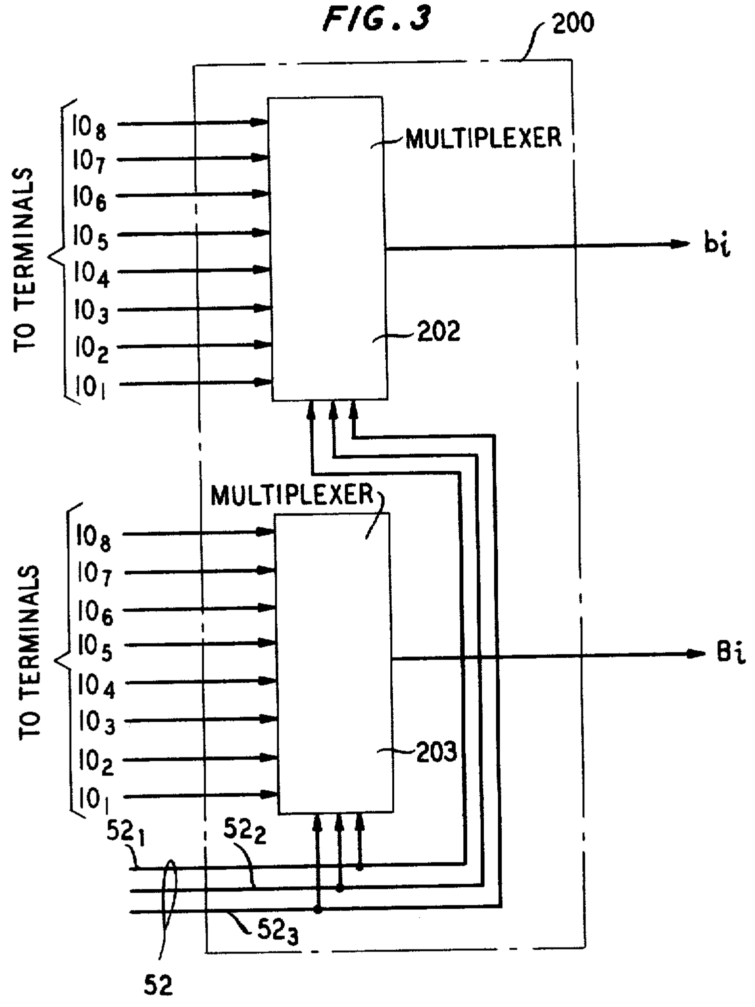
FIG. 3 is a schematic diagram of a concentrator used in the system of FIG. 1.

Concentrator 200 is illustrated in detail in FIG. 3. It comprises a multiplexer 202, e.g., Texas Instruments, Inc., integrated circuit SN74152, connected to the outgoing signals of the digital subscriber terminals of FIG. 1, and a multiplexer 203, identical to multiplexer 202, connected to the incoming signals of the digital subscriber terminals of FIG. 1. Control circuit 500, FIG. 1, provides control signals to multiplexers 202 and 203 via bus line 52 and thus selects the outgoing and incoming signals ($b_i$ and $B_i$) of a particular subscriber terminal to be applied to correlator 400. Concentrator 210 is identical to concentrator 200. Its subscriber terminal selection is controlled by control circuit 500 via bus line 53.

If the system of FIG. 1 is implemented using the criteria of equation (3), multiplexer 202 is not needed in concentrator 200 and multiplexer 203 is not needed in concentrator 210.

Figure 4:
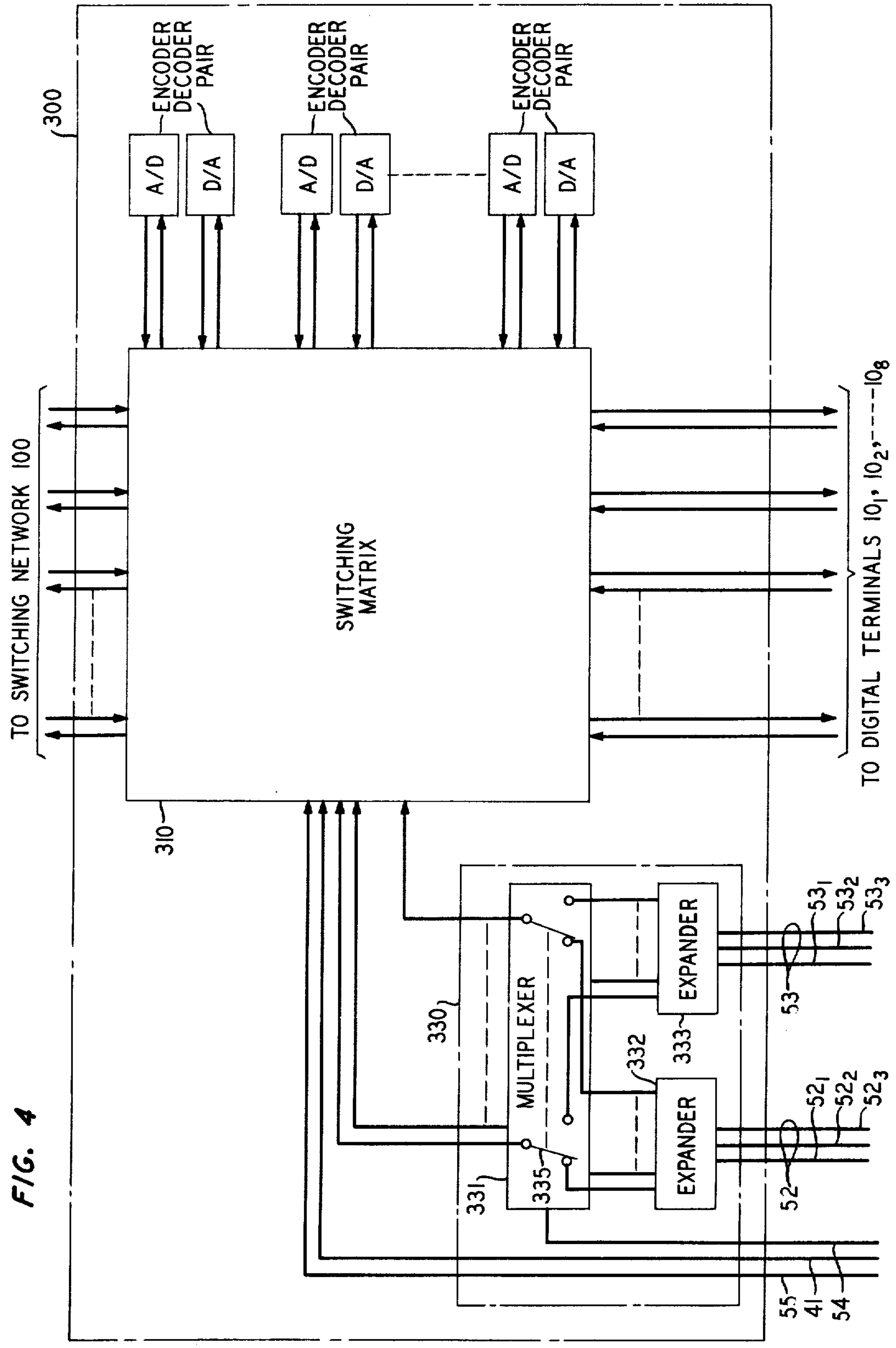
FIG. 4 depicts a block diagram of an encoder-decoder network used in the system of FIG. 1 to connect encoder-decoder pairs to selected digital signal terminals.

FIG. 4 shows a general block diagram of the encoder-decoder network 300 in the system of FIG. 1. Network 300 comprises a plurality of encoder-decoder pairs connected to switching matrix 310, and a matrix control section 330, also connected to matrix 310. Since the encoder-decoder pairs are utilized by matrix 310 on a nondedicated basis, the number of encoder-decoder pairs connected to switching matrix 310 is dependent upon the average activity of the digital terminals in the communication system of FIG. 1. Generally, there are far fewer encoder-decoder pairs than digital terminals. The establishment of encoder-decoder pair interconnections effected by switching matrix 310 is controlled by signals from the digital subscriber terminals connected to the matrix 310, by signals from switching network 100 which is also connected to matrix 310, and by control signals emanating from the matrix control section 330.

When a digital subscriber terminal is activated it requests service from switching matrix 310, and, in response to this request, an idle encoder-decoder pair is interposed between the activated terminal and switching network 100. If the activated terminal requests an interconnection to a terminal which happens to be digital, a signal from switching network 100 controls switching matrix 310, effects the inter-position of another idle encoder-decoder pair, and completes the interconnection to the desired digital terminal. The connection of idle encoder-decoder pairs upon request of a subscriber terminal can be effected in switching matrix 310 in a manner totally similar to the connection of nondedicated common equipment in a crossbar telephone system. This is taught, for example, by A. J. Busch in U.S. Pat. No. 3,585,904, issued Feb. 19, 1952 in column 12 et seq., in reference to dial tone connection in response to a customer's request for service. Also, G. Hecht, U.S. Pat. No. 2,578,701, issued Dec. 18, 1951 teaches the use of a crossbar switching network which controls the establishment of switching paths from any circuit of a first group of circuits to any circuit of a second group of circuits, with provisions for common connect and disconnect control, and for lockout circuitry to protect "busy" interconnections from unrequested disconnections. The Hecht apparatus is well suited for the purposes of switching matrix 310.

Matrix control section 330 controls the disconnection of the encoder-decoder pairs, and the substitution therefor of a direct signal path. In matrix control section 330, selection control signals on bus lines 52 and 53 are connected to expanders 332 and 333 which convert the binary coded terminal designations of bus lines 52 and 53 to a signal on one and only one of the outputs of the expanders. For example, if bus line 52 comprises three lines $52_1$, $52_2$, and $52_3$, as illustrated in FIG. 4, expander 332 can comprise a Texas Instruments, Inc. expander integrated circuit SN74154. Thus, if bus line 52 applies to expander 332 a binary coded signal representative of decimal 3, the SN74154 signal at the output designated 3 will be at a logic 0 level, while the signal at all other outputs will be at a logic 1 level. The output signals of expanders 332 and 333 are connected to multiplexer 331 which contains a plurality of double-throw switches, e.g., switch 335, for selecting and transferring the output signals of expander 332 or of expander 333 to the output of the multiplexer. The selection and transfer are under control of the multiplexing signal on lead 54. Multiplexer 331, which can comprise, for example, Texas Instruments, Inc., AND-OR-INVERTER gate SN5454, applies its output signals to the particular control terminals of switching matrix 310 which uniquely designates the digital terminal and its associated encoder-decoder pair that are subject to control. Thus, when two terminals are selected by concentrators 200 and 210 and are tested by correlator 400, the same terminals are sequentially addressed by matrix 310 under the control of line 54 and bus lines 52 and 53. If communication between the two tested terminals is ascertained, a signal on lead 41 from correlator 400 enables the disconnection of the proper encoder-decoder pairs. If such communication is found not to be present, the signal on lead 41 disables the disconnection of the appropriate encoder-decoder pairs. The actual disconnection, however, is effected by control pulses on lead 55, as applied by control circuit 500.

Figure 5:
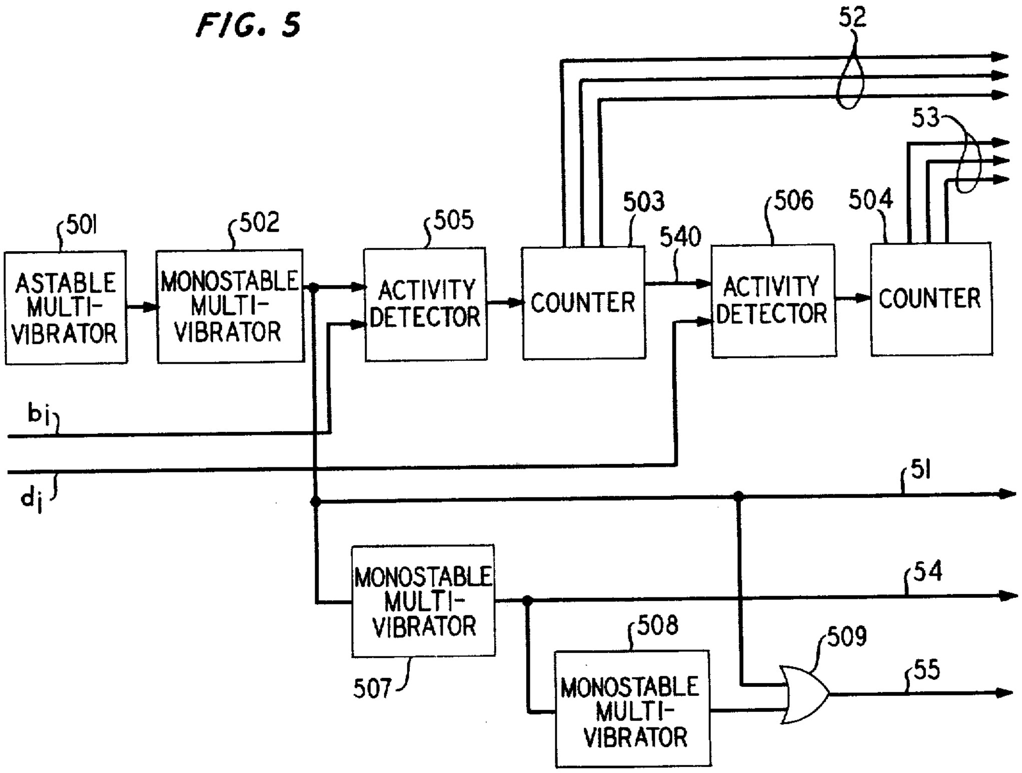
FIG. 5 is a block diagram of a control circuit used in the system of FIG. 1.

Control circuit 500 is illustrated in detail in FIG. 5. It comprises an astable multivibrator 501 oscillating at a preselected test signal frequency, and a monostable multivibrator 502, responsive to astable multivibrator 501, which generates a narrow pulse on lead 51 for controlling averagers 405 and 409. The astable multivibrator 501 and the monostable multivibrators in control circuit 500 can be of any design, e.g., see Chapter 11 of Millman and Taub, *Pulse, Digital, and Switching Waveforms*, McGraw-Hill Book Company, 1965. Connected to monostable multivibrator 502 is a cascade interconnection of an activity detector 505, a binary counter 503, an activity detector 506, and a binary counter 504. The binary counters are designed to sequentially cycle through a number of states equal to the number of digital terminals in the communication system. In the system illustrated in FIG. 1 there are eight digital terminals. Accordingly, counters 503 and 504 can comprise one integrated circuit binary counter each, e.g., Texas Instruments, Inc., SN74193, with control bus lines 52 and 53 connected to multiplexers 200 and 210, respectively, and to encoder-decoder network 300. Since counters 503 and 504 cycle through only eight states, bus lines 52 and 53 comprise three lines each, namely $52_1$, $52_2$, and $52_3$ which jointly define the states of counter 503, and lines $53_1$, $53_2$, and $53_3$ which jointly define the state of counter 504. The two identical activity detectors, elements 505 and 506, which are responsive to selected signals $b_i$ and $d_i$, respectively, determine whether the particular terminals selected by concentrators 200 and 210 are active or inactive. If a terminal selected by either concentrator is found to be inactive, then the appropriate activity detector generates a pulse which advances the appropriate counter, thereby selecting a new terminal for testing by the activity detector and for processing by correlator 400 if the terminal is found to be active. The output of multivibrator 502 can be a short pulse equal, for example, to ten percent of the period generated by multivibrator 501. The output of multivibrator 502 is used by activity detector 505, by astable multivibrator 507, and is applied to lead 51 which resets the switched averagers of correlator 400. Multivibrator 507 generates a fairly long pulse, equal, for example, to 50 percent of the period of the signal generated by multivibrator 501. This signal is applied to lead 54 to effect the multiplexing function in multiplexer 331 and is further applied to monostable multivibrator 508 which generates a short pulse, approximately equivalent in duration to the pulse on lead 51, at the termination of its input pulse. The output signal of multivibrator 508 and the signal on lead 51 are ORed in gate 509. The output signal of gate 509, on lead 55, is applied to switching matrix 310 to actuate the disconnection of unneeded encoder-decoder pairs as described above.

Figure 6:
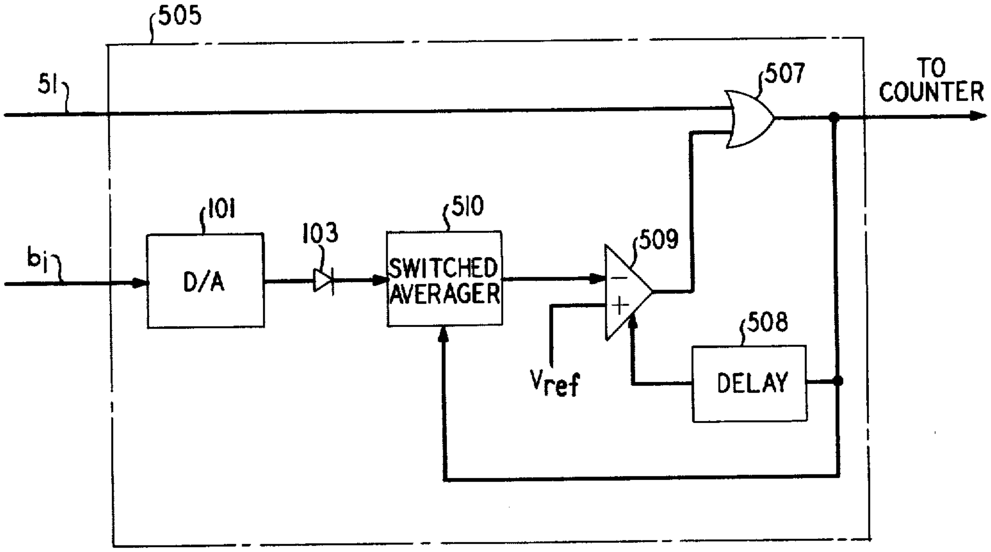
FIG. 6 is a block diagram of an activity detector used in the control circuit of FIG. 5.

A more detailed illustration of activity detector 505 is presented in FIG. 6. Therein, digital signal, $b_i$, applied to the detector is converted to analog form in D/A converter 101 (identical to the D/A converter used in network 300), and the analog signal output of converter 101 is applied to detector didoe 103. The detected signal is integrated in switched averager 510 (identical to averager 405) and is applied to a gated voltage comparator 509 (identical to comparator 410) which compares the output signal of averager 510 to a reference voltage, $V_{ref}$. Thus, if the digital terminal selected by concentrator 200 is active, the voltage output of averager 510 is large; and when comparator 509 is enabled by an output pulse of delay element 508 it displays a low output signal. If the selected terminal is inactive, the voltage output of averager 510 is low; and when the comparator is enabled by the output pulse of delay element 508 it produces a high output voltage pulse. The output signal of comparator 509 is ORed through gate 507 with the normal advance pulse on line 51. The output pulses of gate 507 are applied to counter 503 for advancing purposes, to averager 510 for resetting purposes, and to delay element 508 in preparation for the test of the newly selected terminal. Delay element 508 must present a sufficiently long delay to allow averager 510 to accumulate enough information in order that a reliable activity test can be made. This delay can be achieved simply by cascading a number of integrated circuit OR gates.

In the above manner, counter 503 is advanced through all its states, controlling the terminal selection process of concentrator 200 and network 300 through lines $52_1$, $52_2$, and $53_3$ which comprise bus line 52. When counter 503 completes a cycle through all of its states it produces an output pulse on lead 540. This output pulse is utilized by activity detector 506 as the normal advance pulse to be applied to counter 504. In this manner, for each state of counter 504 as defined by lines $53_1$, $53_2$, and $53_3$, which comprise bus line 53, counter 503 cycles through all of its states. Thus, all possible subscriber terminal pair combinations are selected by concentrators 200 and 210 and by encoder-decoder network 300.

While a particular embodiment of the invention has been shown and described herein, it is not intended that the invention be limited to the above. For example, the invention is also applicable for systems for detecting which of a plurality of terminals is connected to a particular terminal under observation. One example of such application is telephone call tracing. To accomplish this object, multiplexer 210 may be replaced by a direct connection to the terminal under observation. When this terminal is activated, control circuit 500 may also be activated and a trace of the connection can proceed. This method for signal verification is useful in systems with terminals whose signal format is analog as well as digital.

What is claimed is:

1. In a communication system including signal terminals and means for exchanging information therebetween, apparatus for detecting information exchange among said signal terminals comprising:
   - concentrator means connected to said signal terminals for multiplexing the signals of said signal terminals; and
   - correlator means responsive to both the output signal of said concentrator means and to the signal of a selected one of said signal terminals for correlating said concentrator's output signal with the signal of said selected signal terminal to develop a signal indicative of which of said signal terminals exchange information with said selected signal terminal.

2. The apparatus defined in claim 1 wherein said correlator means comprises:
   - a multiplier responsive to said signal of said selected terminal and to said concentrator means output signal; and
   - an averager responsive to said multiplier output signal for developing said correlator output signal.

3. The apparatus defined in claim 2 wherein said concentrator means multiplexes the signal of said signal terminals at a preselected multiplexing frequency and wherein said averager has a predetermined threshold level which is reset in synchronism with said multiplexing frequency of said concentrator means.

4. In a telephonic communication system including a plurality of subscriber signal terminals and means for exchanging information therebetween, apparatus for detecting information exchange among any of said plurality of signal terminals comprising:

a concentrator connected to said plurality of signal terminals for commutating at a preselected commutation frequency the output signals of said plurality of terminals to develop an output signal comprising a plurality of commutated subscriber terminal signals; and a correlator responsive to the output signal of said concentration for correlating each of said commutated subscriber terminal signals with the input signal of a selected signal terminal to develop a signal indicative of which of said plurality of signal terminals exchange information with said selected signal terminal.

5. The apparatus defined in claim 4 wherein said subscriber terminals develop digitally coded signals.

6. The apparatus defined in claim 5 wherein said digitally coded signals of said terminals are pulse code modulated signals.

7. The apparatus defined in claim 5 wherein said digitally coded signals of said terminals are delta modulated signals.

8. The apparatus defined in claim 5 wherein said digitally coded signals of said terminals are adaptive delta modulated signals.

9. The apparatus defined in claim 5 wherein said correlator comprises:

a multiplier responsive to said input signal of said selected terminal and to said commutated subscriber terminal signals;

an averager responsive to the output signal of said multiplier for integrating said multiplier's output signal to develop said output signal of said correlator; and means for resetting the output signal of said integrator to a predetermined level in synchronism with said commutation frequency of said concentrator.

10. In a communication system serving a plurality of signal terminals comprising at least one digital subscriber signal terminal and at least one analog subscriber signal terminal, including A/D converter and D/A converter pairs connected to each of said digital signal terminals, and switching means for interconnecting any of said plurality of signal terminals, the improvement comprising:

a first concentrator for commutating the digital signal of each of said digital signal terminals at a first preselected commutation frequency;

a second concentrator for commutating the digital signal of each of said digital signal terminals at a second preselected commutation frequency;

correlation means responsive to the output signal of said first concentrator and to the output signal of said second concentrator for generating a signal indicative of which of said digital signal terminals selected by said first concentrator are communicating with other of said digital signal terminals selected by said second concentrator; and switching means responsive to said correlation means output signal for disconnecting said A/D converter and D/A converter pairs from the signal path of said digital signal terminals that are communicating with said other digital signal terminals.

11. The system defined in claim 10 wherein said correlator comprises:

a multiplier responsive to said output signal of said first concentrator and to said output signal of said second concentrator providing a signal representative of the product of its input signals;

an averager responsive to the output signal of said multiplier;

means for resetting the output signal of said averager to a predetermined level in synchronism with said first preselected commutation frequency; and threshold comparison means responsive to the output signal of said averager and to a threshold level signal for comparing said output signal of said averager with said threshold level signal to develop said correlator's output signal.

12. The system defined in claim 10 wherein said first concentrator output signal and said second concentrator output signal comprise the outgoing and incoming signals of said digital signal terminals.

13. The system defined in claim 12 wherein said correlator comprises:

a first multiplier responsive to said outgoing signal of said first concentrator and to said incoming output signal of said second concentrator providing a signal representative of the product of its input signals;

a first averager responsive to the output signal of said first multiplier;

a second multiplier responsive to said outgoing output signal of said second concentrator and to said incoming output signal of said first concentrator providing a signal representative of the product of its input signals;

a second averager responsive to the output signal of said second multiplier;

means for resetting the output signal of said first averager and of said second averager to a predetermined level in synchronism with said first preselected computation frequency;

first threshold comparison means responsive to the output signal of said first averager and to a threshold level signal for comparing said output signal of said first averager with said threshold level signal;

second threshold comparison means responsive to the output signal of said second averager and to said threshold level signal for comparing said second averager output signal with said threshold level signal; and an OR gate responsive to the output signals of said first threshold comparison means and said second threshold comparison means to develop said correlator's output signal.

14. In a telephonic communication system serving a plurality of digital subscriber terminals and analog subscriber terminals, apparatus for attaching encoder-decoder pairs to selected digital terminals based upon need comprising:

first switching means connected to said analog subscriber terminals and to said digital subscriber terminals for interconnecting, upon request, any of said terminals to any other of said terminals;

a plurality of encoder-decoder pairs;

second switching means connected to said first switching means, to said digital subscriber terminals, and to said encoder-decoder pairs for interposing said encoder-decoder pairs within the communication signal path of selected ones of said digital subscriber terminals;

a first concentrator for multiplexing the digital signals of each of said plurality of digital subscriber terminals at a first preselected multiplex frequency;

a second concentrator for multiplexing the digital signals of each of said plurality of digital terminals at a second preselected multiplex frequency;

a correlator responsive to the output signal of said first concentrator and to the output signal of said second concentrator for generating a signal indicative of which of said digital terminals is communicating with others of said digital terminals; and means responsive to said correlator output signal for controlling said second switching means to disconnect those of said converter pairs that are interposed in the signal paths of said digital terminals which are communicating with other digital terminals, as determined by said output signal of said correlator.

15. The system defined in claim 14 wherein said first concentrator output signal and said second concentrator output signal comprise the outgoing and incoming signals of said digital signal terminals.

16. In a telephonic communication system serving a plurality of digital and analog subscriber terminals, apparatus for attaching encoder-decoder pairs to selected digital terminals based upon need comprising:

first switching means connected to said analog subscriber terminals and to said digital subscriber terminals for interconnecting, upon request, any of said terminals to any other of said terminals;

a plurality of encoder-decoder pairs;

second switching means responsive to said first switching means to said digital subscriber terminals, and to said encoder-decoder pairs for interposing said encoder-decoder pairs within the signal path of selected ones of said digital subscriber terminals;

a first concentrator for multiplexing the digital signal of each of said plurality of digital subscriber terminals that are active at a first preselected multiplex frequency;

a second concentrator for multiplexing the digital signal of each of said plurality of digital terminals that are active at a second preselected multiplex frequency;

a correlator responsive to the output signal of said first concentrator and to the output signal of said second concentrator for generating a signal indicative of which of said active digital terminals is communicating with other of said active digital terminals; and means responsive to said correlator output signal for controlling said second switching means to disconnect those of said converter pairs that are interposed in the signal paths of those of said digital terminals which are communicating with other digital terminals.

* * * * *

UNITED STATES PATENT AND TRADEMARK OFFICE

CERTIFICATE OF CORRECTION

PATENT NO. : 3,891,805

DATED : June 24, 1975

INVENTOR(S) : James Loton Flanagan and Nuggehally S. Jayant

It is certified that error appears in the above-identified patent and that said Letters Patent are hereby corrected as shown below:

First page of patent, below "[76] Inventors:" and above "[22] Filed" insert --Assignee: Bell Telephone Laboratories, Incorporated, Murray Hill, N. J.
Col. 3, line 39, that portion of the formula reading "$B_i d_{i-L}$" (first occurrence) should read --$B_i d_{i+L}$--; "$D_i b_{i-L}$" (second occurrence) should read --$D_i b_{i+L}$--. Col. 4, Line 30, that portion of the formula reading "$(B_i d_{i-L} + D_i b_{i-L})$" should read --$(B_i d_{i+L} + D_i b_{i+L})$--; line 38, that portion of the formula reading "$B_i d_{i-L}$" should read --$B_i d_{i+L}$--. Col. 7, line 55, "didoe" should read --diode--. Col. 8, line 15, "$53_3$" should read --$52_3$--. Col. 9, line 13, "concentration" (first word) should read --concentrator--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*